United States Patent [19]
Van Cott

[11] Patent Number: 4,994,720
[45] Date of Patent: Feb. 19, 1991

[54] HGP² ELECTRIC MOTOR

[76] Inventor: Clifton Van Cott, 35 Spring St., Cold Spring Harbor, N.Y. 11724

[21] Appl. No.: 468,623

[22] Filed: Jan. 23, 1990

[51] Int. Cl.⁵ .............................................. H02P 6/02
[52] U.S. Cl. ..................................... 318/254; 318/138
[58] Field of Search ...................... 318/138, 254, 439; 310/156

[56] References Cited

U.S. PATENT DOCUMENTS

| | | | |
|---|---|---|---|
| 4,249,116 | 2/1981 | Hieda | 318/439 X |
| 4,283,664 | 8/1981 | Ebert | 318/254 X |
| 4,295,085 | 10/1981 | Lafuze | 318/254 X |
| 4,303,871 | 12/1981 | Berry | 318/254 X |
| 4,400,654 | 8/1983 | Elliott | 318/254 |
| 4,415,845 | 11/1983 | Oudet | 318/254 X |
| 4,433,261 | 2/1984 | Nashiki et al. | 310/156 |
| 4,603,283 | 7/1986 | Oltendorf | 318/254 |
| 4,629,921 | 12/1986 | Gavaletz | 310/156 |

Primary Examiner—Bentsu Ro

[57] ABSTRACT

A DC electric motor comprised of a rotor constructed of separate permanent magnets spaced equally apart and embedded in a circular nonmagnetic plate with magnetic fields directed outward. Each alternate pole is reversed in polarity so that no two poles of similar polarity are adjacent to each other. The rotor is propelled by the stator which contains multiple electromagnetic coils which are placed at equal angles around the entire 360 degree circumference, with magnetic fields directed inwards.

The stator coils are pulsed with positive and negative currents in a specific timing sequence to achieve maximum power and efficiency from the motor. The results produce a significant gain relationship of output power versus input power when the rotor magnets are constructed of materials that yield high flux densities when magnetized. The motor also contains self starting and efficiency control logic.

3 Claims, 7 Drawing Sheets

HGP² ELECTRIC MOTOR

BACKGROUND OF THE INVENTION

The present invention generally relates to electric motors and more specifically to motors that are energy efficient and can drive heavy loads using direct current as a power source. The utility of this device is directly applicable to powering an automobile, as a replacement for the fuel burning combustion engine.

Currently, a resurgence of interest has been generated in attempting to build a practical usable electrically driven vehicle, and although progress has been steady, there has been little accomplished in reducing the power requirements of the motor. Conversely, the emphasis has been directed towards reducing vehicle weight, road friction and charging batteries with solar cells.

Therefore, coupled with the above improvements, if an efficient motor existed, electric cars would become more practical. Since energy conservation was not a major concern during the conception of the electric motor, current designs still neglect to recognize a few basic principles that are inherent to a motor's power and efficiency. These detracting conditions are the geometric power losses due to the increased distance between interacting magnetic fields as the rotor rotates and additional power reductions due to the changes in angle between the interacting fields, causing the power to decrease as a sine function as the angles decrease from perpendicularity. Also, little recognition has been applied to the principle of using small electromagnetic fields to drive much larger permanent magnetic fields to increase the ratio of output to input power. Optimization of the above parameters included with this addition of improved components will provide a more efficient motor.

SUMMARY OF THE INVENTION'S OBJECTIVES AND ADVANTAGES

Accordingly, the general objective of the present invention is to provide a unique and useful electric motor in which the above disadvantages have been eliminated. Other and more specific objectives include:

A reduction of internal motor friction by the replacement of friction producing components (brushes, shaft angle encoders, ect.) with non-friction producing components or concepts.

An increase in proximity of energized coils or electromagnetic fields to interacting permanent magnetic fields.

A reduced angle deviation from perpendicularity of interacting magnetic fields.

Inclusion of safety logic to preclude catastrophic failures

A reduced energized time of coils during periods which contain either poor direction angles or great distances between the energized coil and the interacting permanent magnetic field.

To obtain greater power by using the electromagnetic coils in both attracting and repelling (push-pull) modes and therefore, also implying the capability of reversing the current in each coil to produce fields of both polarities.

Self starting logic to eliminate extra hardware and conserve power.

An increase to the true gain of the motor, which is the ratio of output power to input power, by increasing the ratio of permanent magnetic energy to applied (or electromagnetic) energy.

To reduce parts and machining to simplify manufacturing

Creation of a design that can adapt to user load requirements by simply modifying component dimensions or power specifications.

Creation of a control system for the motor that can not only precisely time and regulate power but also control direction and speed.

DETAILED DESCRIPTION

Figure 1:
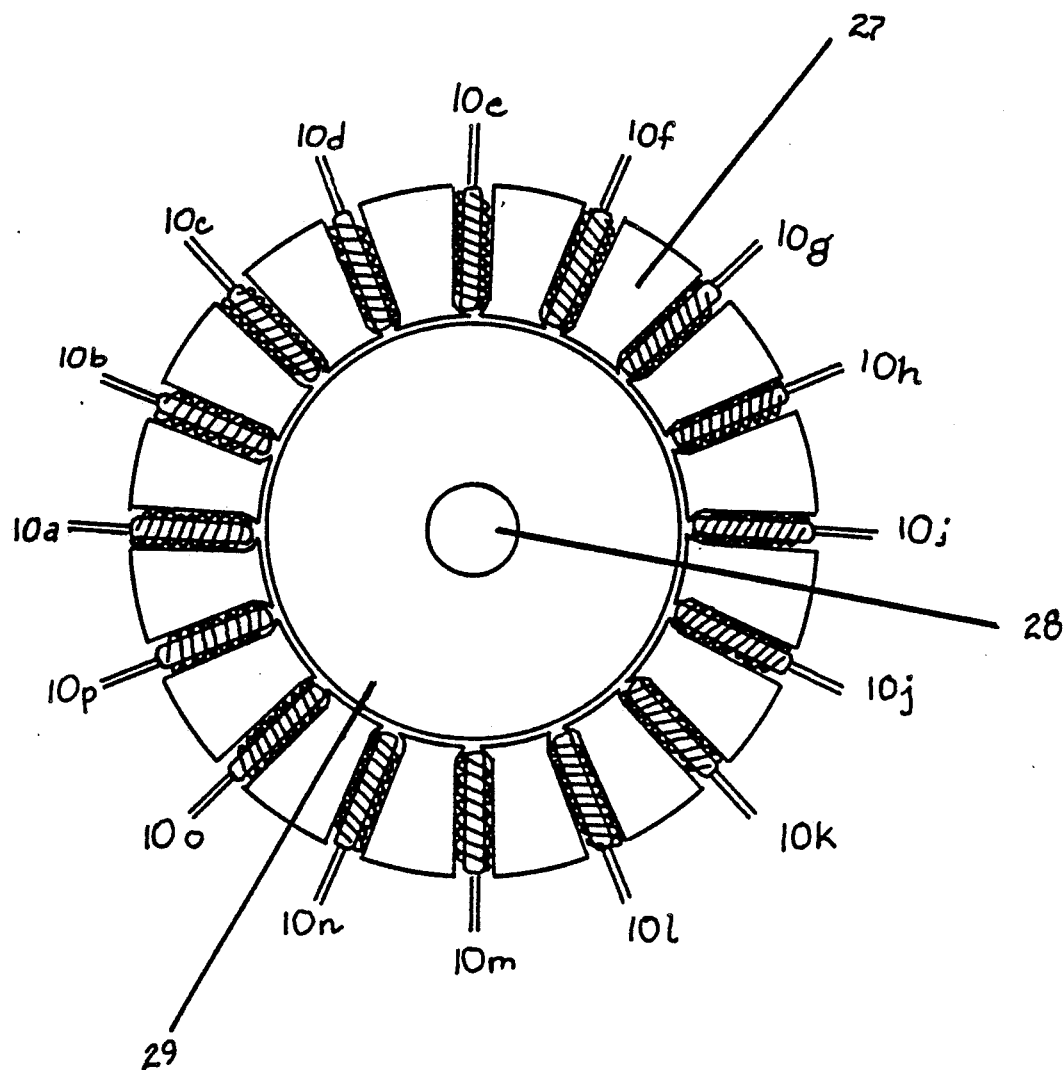
FIG. 1 is a front view of an exposed rotor, stator, stator coils and drive shaft.

As shown in FIG. 1 of the HGPP electric motor which contains a rotor 29 including permanent magnet poles, a rotary shaft 28 fixed to the rotor 29 and axially supported by bearings at both ends, a stator assembly 27 and stator coils 10a-p. The stator assembly 27 contains a chamber for each stator coil 10a-p and are placed at equal angles around the cylindrical opening which contains the rotor 29. The stator coils 10a-p are individually excitable in pairs (i.e. a+i,b+j,c+k,d+l, e+m,f+n,g+o and h+p). The rotor 29 fits within the cylindrical opening in the stator assembly 27 with a small airgap (e.g. <0.005 inches) between the two parts. Both the rotor 29 (excluding magnets) and the stator assembly 27, are made from nonmagnetic materials that have low thermal resistivity. Each stator coil 10a-p, is mounted close to the edge of the cylindrical opening in the stator assembly 27, with similar fields directed inwards.

Figure 2:
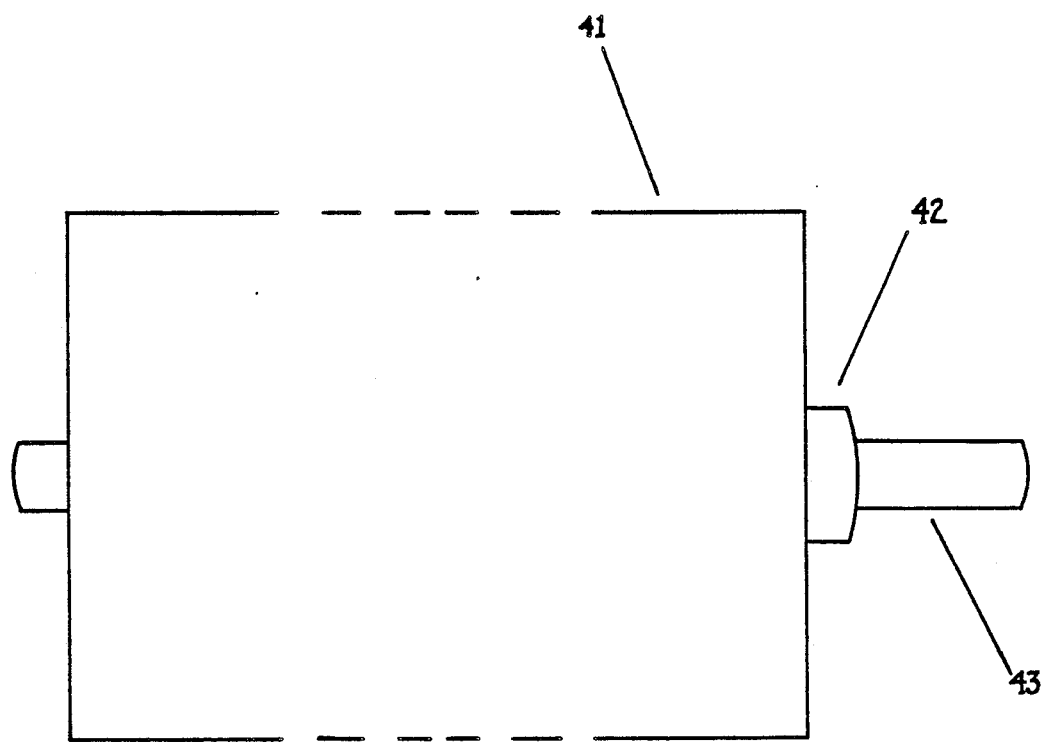
FIG. 2 is a side view of the motor to illustrate the ability to increase power by horizontal expansion of the motor and to show a potential location of the optical shaft angle encoder.
Figure 3:
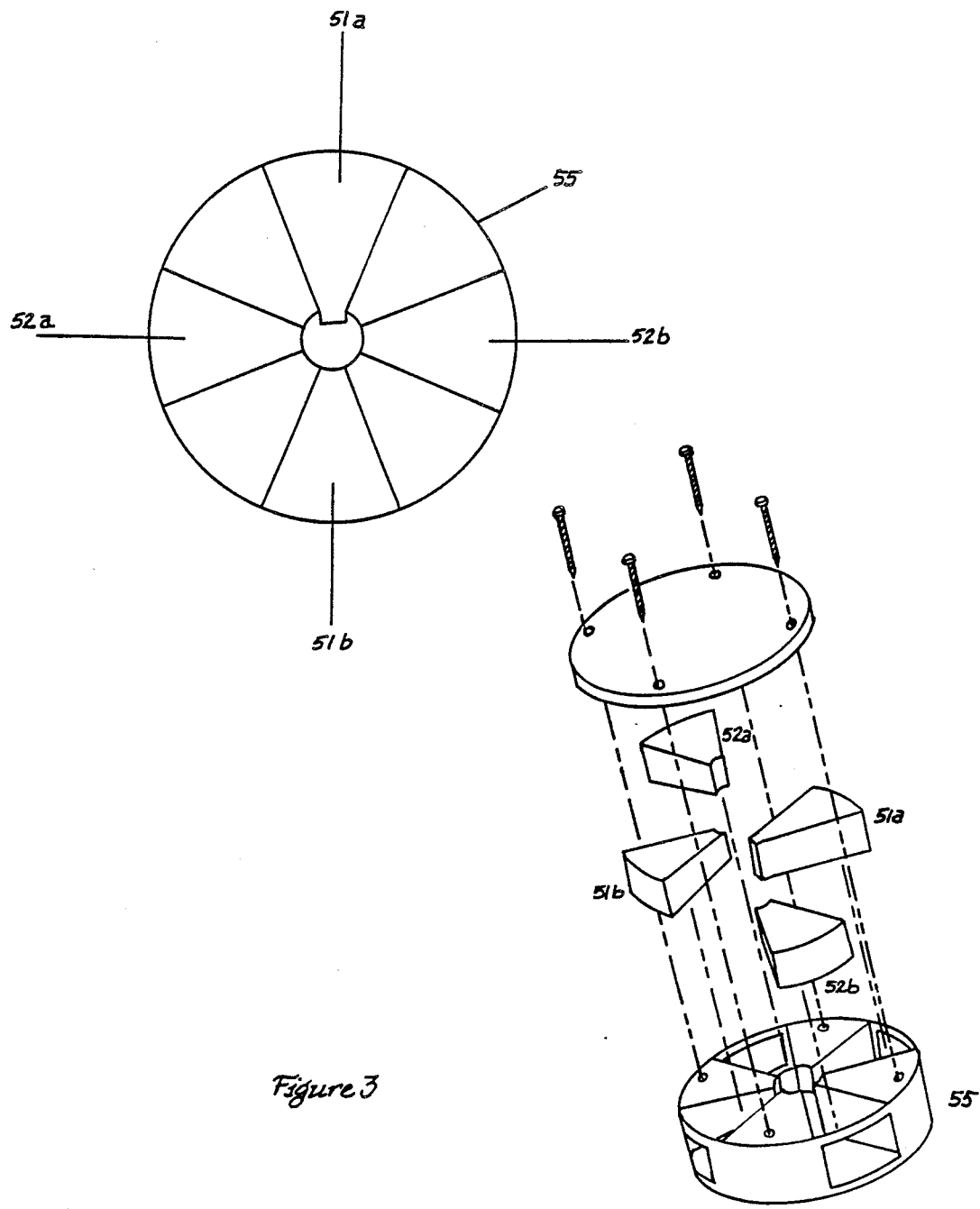
FIG. 3 contains a front and angular view of the rotor.

FIG. 2 is an example of horizontally expanding the motor assembly 41 (including all relative internal parts) to achieve greater power. This concept can also be maintained with vertical expansion. An optical shaft encoder 42, reads the shaft angle and sends the digitized 10 bit value to the critical angle decoder circuit in FIG. 3. Internal to the motor assembly 41 are all the working parts of the motor including bearings, housings, stator, coils fans and wire assemblies. The rotory shaft 43 is extended through at least one end of the motor assembly 41 for driving loads. FIG. 3 is the rotor assembly 55 with a notched opening for rotory shaft FIG. 2-43 connection in the center and first rotor magnets 51a-b and rotor magnets 52a-b spaced equally at 90 degree angles with poles positioned outwards. First rotor magnets 51a-b are polarized with northpoles outwards and second rotor magnets 52a-b are polarized with southpoles outwards. Rotor magnets 51a–b and 52a–b are made of high density iron (e.g. Neodymium Iron Nd Fe).

Figure 4:
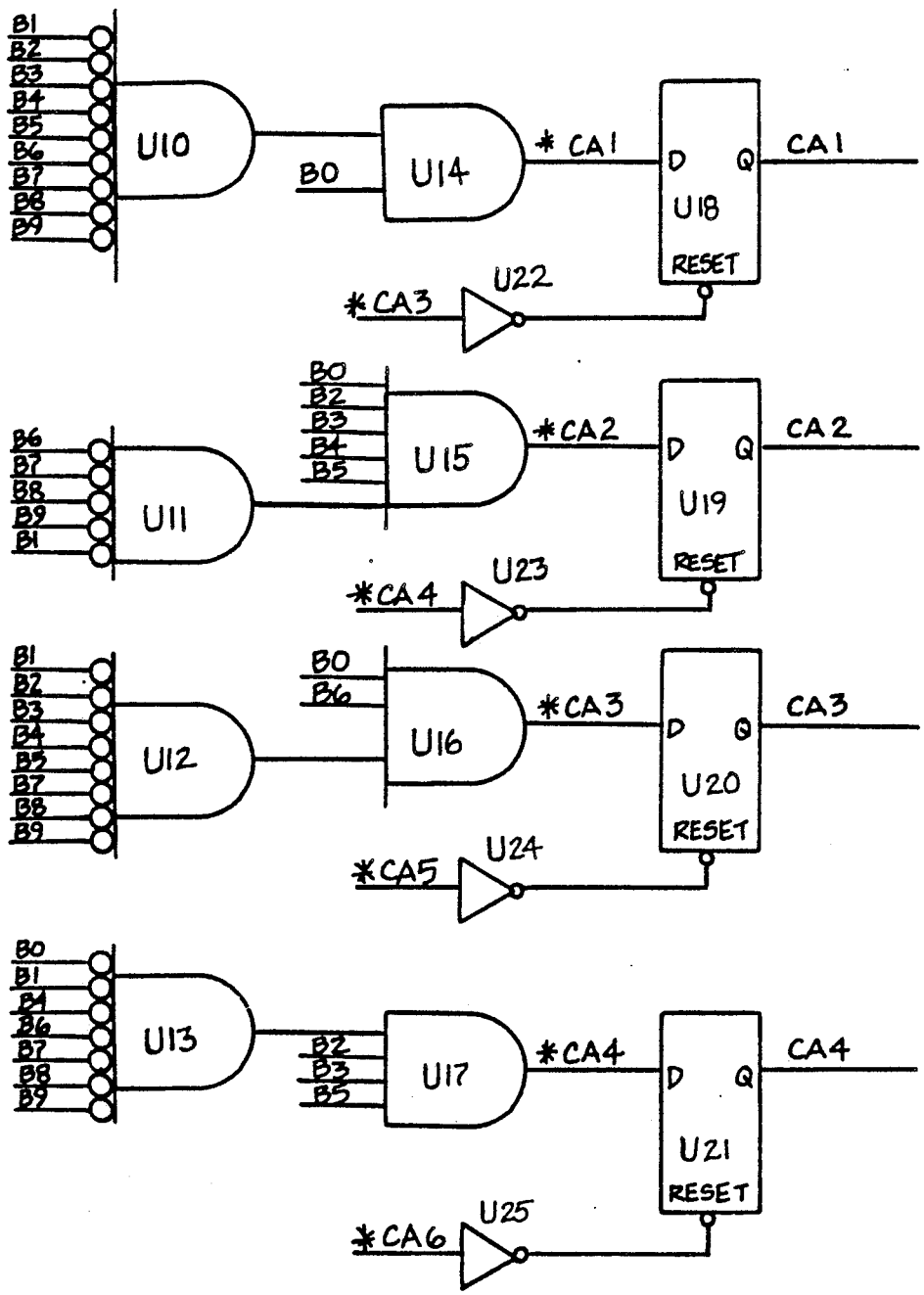
FIG. 4 is an example of a critical angle decoder for angles CA1-4.

FIG. 4 is the Critical Angle Decoder logic which switches stator coils (FIG. 1-10a–p) currents to determine the direction of the rotor's (FIG. 1-29) rotation. The example diagram of FIG. 4 contains hardware to decode only 4 critical angles because there are various implementations of this logic including the use of a microprocessor. This particular configuration is cited as an example only. Therefore, the equations necessary to calculate the these angles, assuming clockwise rotation are specified below:

First determine the nominal positions for each critical angle (CA) in which the rotor FIG. 1-29 is perpendicular to each stator coil FIG. 1-10a–p field as follows:

360 degrees/number of coils or for example;

360 degrees/16=22.5 degrees

Next, calculate for advancing the waveform to account for delays in switching the coil current off;

*advance angle (X) > (maximum RPM) × (switch delay time for current)*

Convert maximum RPM into rotations per second by multiplying by degrees/60 seconds;

using 6,000 RPM and a delay of 167 microseconds:

*X > (6,000 degrees/sec) × (167 microseconds) = 1 degree*

Leading critical angles are used to disable the stator coil (FIG. 1-10a–p) current for the pole most perpendicular to the rotor and enable the next approaching pole in the direction of rotation when in the pulling or attracting mode. This is done to ensure smooth and correct directional flow of the rotor.

Therefore, the leading critical angles can be defined as the stator coil FIG. 1-10a–p nominal position angles minus the advance angle (X). For the example cited, the leading critical angles are:

| CA | 2 = 21.5 degrees | CA | 18 = 201.5 degrees |
|---|---|---|---|
|  | 4 = 44 degrees |  | 20 = 224 degrees |
|  | 6 = 66.5 degrees |  | 22 = 246.5 degrees |
|  | 8 = 89 degrees |  | 24 = 269 degrees |
|  | 10 = 111.5 degrees |  | 26 = 291.5 degrees |
|  | 12 = 134 degrees |  | 28 = 314 degrees |
|  | 14 = 156.5 degrees |  | 30 = 336.5 degrees |
|  | 16 = 179 degrees |  | 32 = 359 degrees |

The lagging critical angles, are the angles in which the stator coils (FIG. 1-10a–p) begin to push (or repell) the rotor (FIG. 1-29) to aid in the continuation of its directional rotation. The lagging critical angles can be defined as the first measureable angle increment past the nominal position values of critical angles that is detectable by the optical shaft angle encoder FIG. 2-42. That value for the cited example is 0.3516 degrees.

Therefore, the lagging critical angles are defined below for the example cited:

| CA | 1 = .3516 degrees | CA | 17 = 180.3516 degrees |
|---|---|---|---|
|  | 3 = 22.8516 degrees |  | 19 = 202.8516 degrees |
|  | 5 = 45.3516 degrees |  | 21 = 225.3516 degrees |
|  | 7 = 67.8516 degrees |  | 23 = 247.8516 degrees |
|  | 9 = 90.3516 degrees |  | 25 = 270.3516 degrees |
|  | 11 = 112.8516 degrees |  | 27 = 292.8516 degrees |
|  | 13 = 135.3516 degrees |  | 29 = 315.3516 degrees |

-continued

| | |
|---|---|
| 15 = 157.8516 degrees | 31 = 337.8516 degrees |

In FIG. 4, U10–17 are used to decode the binary outputs from optical shaft encoder U26. These outputs are then stored in data registers U18–21. The pulsewidth of each critical angle strobe is determined by the reset inputs to U18–21 and are controlled by the occurrence of the next critical angle strobe from that angle group (leading or lagging) and are output through inverters U22–25 The above logical outputs are then applied to the coil enable/rotational rate controller in FIG. 7. This additional logic determines the stator coil current timing sequence and rotational rate, The example diagram in FIG. 7 contains circuits for coil groups 1/9, 2/10 and 3/11. The rotation rate of the rotor is controlled by the output from the variable oscillator U58 logically ANDED with the coil enable signals.

U40–45 determine the angles that enable each coil group. Those outputs are divided into two groups. Each group defines the current direction or field polarity. U46–51 outputs define the rotation rate of the rotor and is controlled by the output of U58 the variable oscillator. U52–57 are safety logic, used to prevent coils from accidently being enabled in two directions upon a hardware or bit failure.

From FIG. 3, the rotor field 1 of permanent rotor magnet 52a will be considered having a negative (−) field and aligned perpendicular to stator coil 1 (FIG. 1-10a) the optical shaft encoder (FIG. 2-42) will output a 10 bit binary code representing a zero degree shaft angle position. When the same said rotor field is aligned perpendicular to stator coil 2 (FIG. 1-10b), the same said encoder shall will output a 10 bit binary code representing 22.5 degrees. This same logic is continued clockwise around the stator assembly (FIG. 1-27) stator coil 16 (FIG. 1-10p) is reached, representing 337.5 degrees of the same said binary code.

Figure 5:
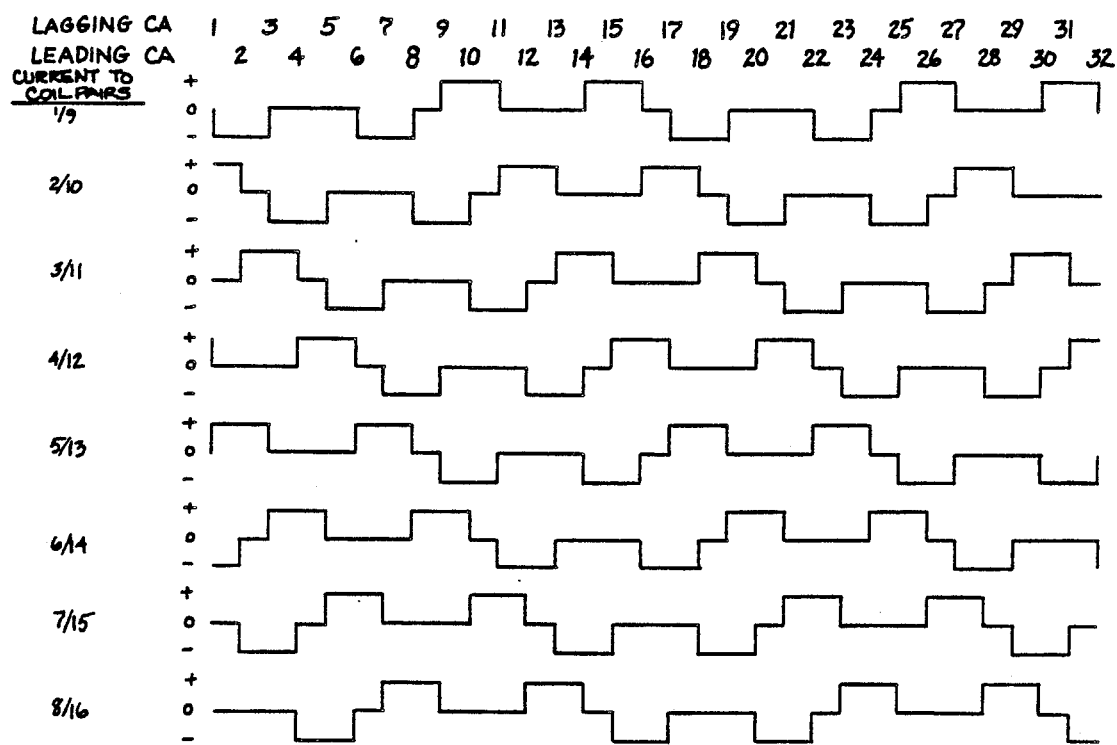
FIG. 5 is a timing diagram of stator coil input currents in relation to rotor position.

Referring to FIG. 5, the coil currents are defined with respect to the position of rotor field 1 (−) at each of the critical angles (CA1-32) listed. Additional advance current is supplied to coils adjacent to coils that are perpendicular to the rotor field in order to provide power to the rotor (FIG. 1-29) upon initial startup or during continuous operation when rotor fields are nulled or perpendicular to stator coils 1–16 from FIG. 1-10a–p respectively. Therefore, the energized time of the above said coils is slightly increased to help provide automatic start-up during nulled states or added power during continuous rotation.

Figure 6:
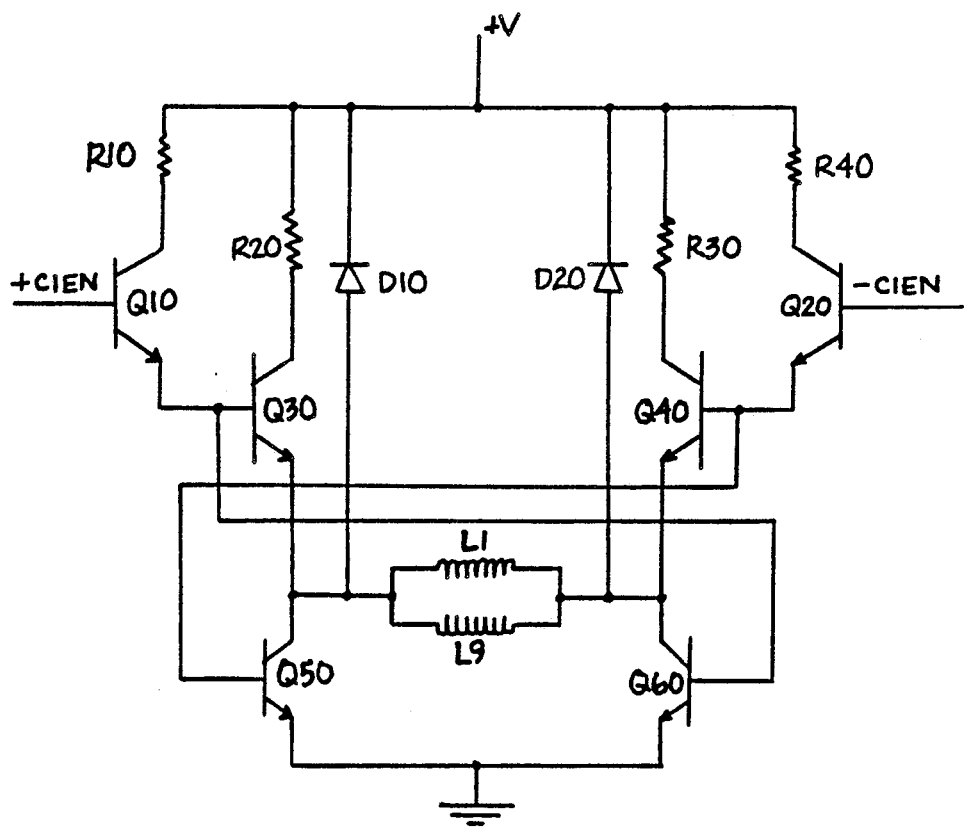
FIG. 6 is an example diagram of a driver switch circuit used to generate bidirectional currents for the stator coils.
Figure 7:
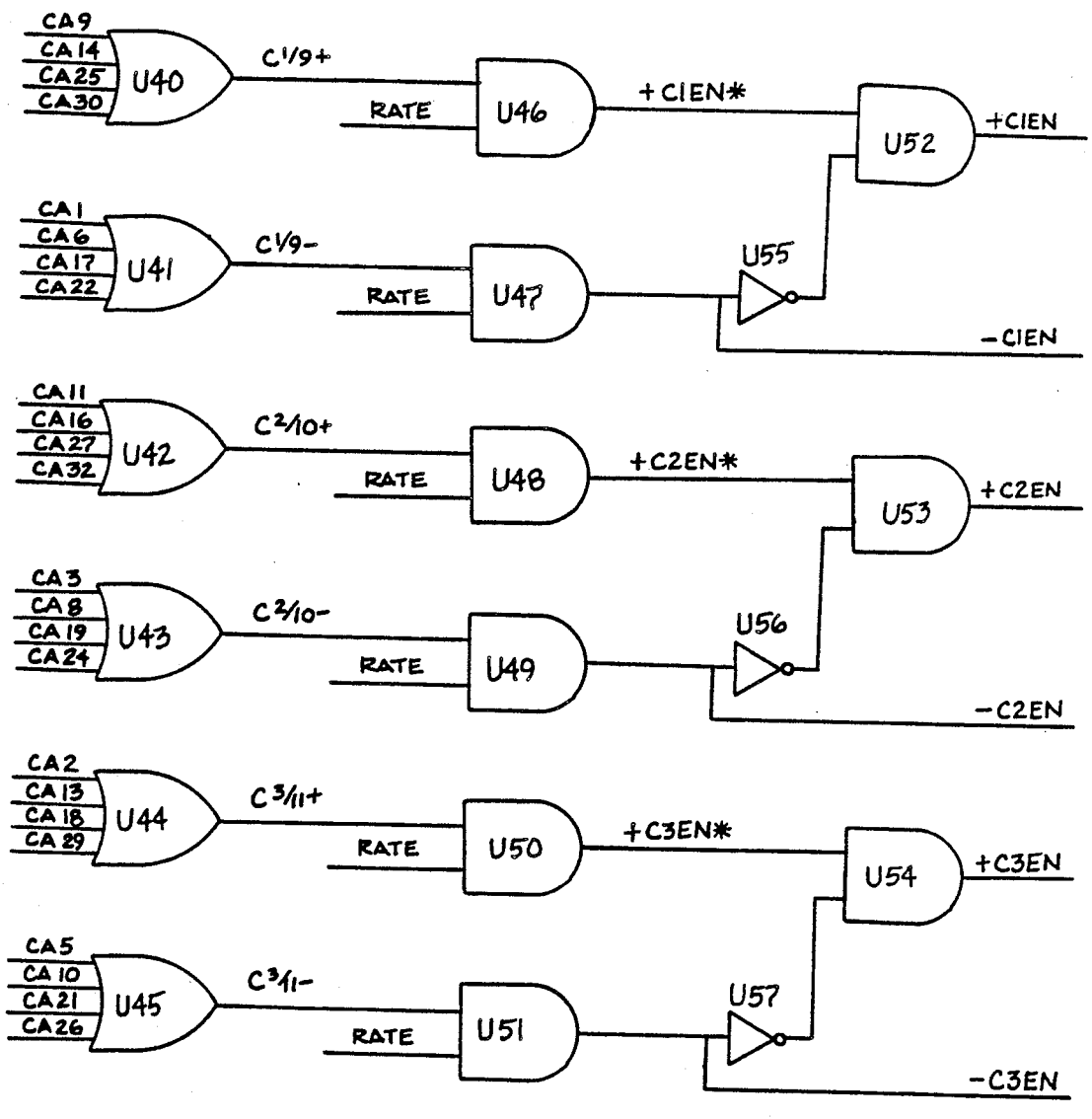
FIG. 7 is an example diagram of the coil enable and rotation rate controller for coil groups 1/9, 2/10 and 3/11 only.
Figure 7:
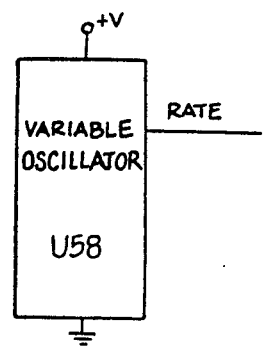

This additional current may be eliminated during continuous operation to further reduce energy. This will result in a 3% reduction of input power (i.e. 8×1.3516 degrees/360 degrees=0.03). FIG. 6 is a typical driver switch circuit used to generate the bidirectional currents for the stator coils (FIG. 1-10a–p). For the example hardware cited, there would be one circuit for each pair of coils. L1 and L9 represent coil group 1/9 from FIG. 1-10a+i. Q10,30 and 60 are enabled concurrently to provide positive current flow through L1 and L9. Q20,40 and 50 are enabled to provide negative current flow through L1 and L9.

Diodes D10 and 20 provide clamping and overvoltage protection. Q10,20 and R10,40 provide current boost (if necessary) from logical inputs. Additional resistors, diodes or a combination of both, may be required at the emitters of Q10–40 to prevent false enables and provide greater noise immunity depending on input leakage current. R20,30 determine the peak current to each coil pair.

Therefore, the current to each coil = +V/R20 or 30.

Since there are always 8 coils enabled, the motor input current is defined as 8×(+V/R20) and the input power as 8×(+V/R20). The gain of the motor will be the combination of the input power plus the inherent power of the rotor permanent magnetic forces and aerated by the sine of the rotor angle from the enabled coils and the square of the distance of the two fields. By keeping the rotor fields of greater proportional strength to the stator fields, an apparent gain is achieved.

The HGPP motor will start to operate as soon as power is applied, with the rotor beginning to rotate immediately with the incorporated self starting design provided in the waveform timing. Depending on the load, the variable oscillator FIG. 7 should be increased slowly at first until the rotor has begun rotating at a rate fast enough to increase rotation at the same rate the variable oscillator increases frequency. The current waveforms to the coils maintain the characteristics shown in FIG. 5, except for the fact that this figure is drawn in the frequency domain. In the time domain, the waveforms will expand and contract horizontally with the RPM of the motor if the horizontal axis of the plot is changed to time. The basic concept of the invention is to take advantage of energy available in permanent magnetic fields and to optimize the design of energy available within interactive magnetic fields.

If the strength of a permanent magnetic field is greater in value than an interacting electromagnetic field, then the force produced as the result of these two fields interacting will be much greater then the energy used for the excitation of the electromagnetic field alone. Although, no energy has been created, the apparent strength of the electromagnetic field has teen amplied to a greater value in a similar manner that a transistor amplifies a small ac signal input to the value of the larger dc bias voltage in a simple amplifier circuit. To properly extract this energy, two important concepts must be maintained. First, magnetic field strength decreases as a square of the distance and secondly, the amount of force decreases as an angular (sine) function as indicated in the equation below:

$$\text{Magnetic Force} = \frac{(\text{Field Intensity})(\sin \theta)}{(\text{Distance})^2}$$

Therefore, when designing a device in which the use of energy is a major consideration, the magnetic forces must be maintained in proximity and at perpendicular angles.

In conclusion, the invention was created with a specific use in mind, that was replacing the fuel burning combustion engine in automobiles. The specific advantages of this motor compared to other electric motors are the enhanced motor efficiency characteristics due to the proximity and perpendicularity of the interacting fields, elimination of friction producing components, a design that lends to capitalizing on forces produced by permanent magnets (that are available now with greater flux densities since the introduction of rare earth materials into this field), greater precision and versatility of the motor by using more logic to control rotation rate, direction and power consumption parameters and optimization of stator coil usage by the use of bidirectional currents.

Therefore, a motor which can perform work with less input power is highly desireable and can be used in a battery driven vehicle that may need to be driven at high speeds or over long distances or both.

What is claimed:

1. A brushless DC motor of the type having a rotor of permanent magnet poles and multiple stator coil windings and drive system for controlling the direction, speed and torque of the said DC motor, with said drive system comprising:

means for deriving angular position from a motor shaft of said motor as said motor rotates;

means for decoding said angular position into correlation signals for enabling said stator coil windings;

a variable oscillator having an output signal related to said correlation signals;

means for allowing current to flow in either direction through the said stator coil windings;

means for combining said variable oscillator output signal with said correlation signals for enabling and controlling the duty cycle of said driver switch current signals;

means for providing said current signals to said multiple coil windings simultaneously;

a direct current power source;

means for providing frictionless rotation of said rotor;

means for providing a permanent magnetic force of said rotor greater than an electromagnetic force of each individual stator coil winding;

means for providing 360 degree angular coverage of interacting fields between said rotor and said stator coil windings;

means for determining the proximity and perpendicularity of said stator coil windings to said rotor;

means for generating signals for the self starting of said DC motor;

means for enabling said current signals to allow both the attraction and repelling of said rotor by said stator coil windings while said rotor is rotating in a single direction.

2. The motor of claim 1 wherein said permanent magnet poles of said rotor are composed of rare earth materials as Neodymium Iron (NdFe) or equivalent.

3. The motor of claim 1 in which the number of said current signals provided to multiple said stator coil windings is variable to reduce the current output from said direct current power source.

* * * * *